United States Patent [19]

Origuchi

[11] Patent Number: 5,799,748
[45] Date of Patent: Sep. 1, 1998

[54] OPERATING STATE DETECTING SYSTEM OF FREE-WHEEL HUB MECHANISM FOR FOUR-WHEEL-DRIVE VEHICLES

[75] Inventor: Tamotsu Origuchi, Fujisawa, Japan

[73] Assignee: Nissan Motor Co., Ltd., Yokohama, Japan

[21] Appl. No.: 616,806

[22] Filed: Mar. 15, 1996

[30] Foreign Application Priority Data

Mar. 16, 1995 [JP] Japan .................................. 7-057637

[51] Int. Cl.$^6$ ............................................ B60K 17/34
[52] U.S. Cl. ............................................ 180/233; 180/249
[58] Field of Search ......................... 180/233, 248, 180/249; 364/424.098; 701/29, 51

[56] References Cited

U.S. PATENT DOCUMENTS

| | | | |
|---|---|---|---|
| 4,700,797 | 10/1987 | Leiber | 180/249 |
| 4,757,870 | 7/1988 | Torii et al. | 180/233 |
| 4,854,414 | 8/1989 | Koide et al. | 180/249 |
| 4,989,685 | 2/1991 | Matsuda | 180/233 |
| 4,991,680 | 2/1991 | Shiba et al. | 180/233 |

FOREIGN PATENT DOCUMENTS 64-052815  3/1989  Japan .

*Primary Examiner*—Paul N. Dickson
*Attorney, Agent, or Firm*—Foley & Lardner

[57] ABSTRACT

A system for detecting an operating state of an automobile free-wheel hub mechanism used for connecting and disconnecting a driveshaft to and from a wheel hub by engaging and disengaging a fixed gear firmly connected to the driveshaft for rotation with the driveshaft with and from a movable gear slidably splined to the inner periphery of a cylindrical housing of the wheel hub, comprises sensors for detecting a revolution speed of a road wheel having the wheel hub to generate a wheel-speed indicative signal, another sensors for detecting a revolution speed of the driveshaft to generate a driveshaft revolution-speed indicative signal, and a controller for detecting an operating state of the free-wheel hub mechanism on the basis of a deviation between a value of the wheel-speed indicative signal and a value of the driveshaft revolution-speed indicative signal.

7 Claims, 4 Drawing Sheets

OPERATING STATE DETECTING SYSTEM OF FREE-WHEEL HUB MECHANISM FOR FOUR-WHEEL-DRIVE VEHICLES

BACKGROUND OF THE INVENTION

1. Field of the Invention

The present invention relates to an operating state detecting system of a free-wheel hub mechanism suitable for use in four-wheel-drive automotive vehicles, and specifically to a detecting system for detecting an operating state of a free-wheel hub mechanism which functions to connect an axle shaft of an auxiliary drive shaft (corresponding to a front axle shaft in case of more common front-engine four-wheel-drive vehicles) to a wheel hub or to disconnect the front axle shaft from the hub when switching from a two-wheel-drive mode to a four-wheel-drive mode or vice versa.

2. Description of the Prior Art

A so-called part-time four-wheel-drive vehicle in which a two-drive mode and a four-wheel drive mode are switchable by means of a transfer, is equipped with a free-wheel hub mechanism for the purpose of engagement and disengagement between the axle driveshaft of the auxiliary drive-wheel side and the wheel hub. In the conventional front-engine part-time four-wheel-drive vehicle in which rear drive wheels serve as main drive wheels, whereas front drive wheels serve as auxiliary drive wheels, the well-known transfer is provided for distributing the engine power between front and rear axle drive shafts at a predetermined distribution ratio, such as 50%:50% at a four-wheel-drive mode or 0%:100% at a two-wheel-drive mode. For example, when the drive mode was shifted from the four-wheel-drive mode to the two-wheel-drive mode by way of a transfer shift lever or a mode-selection switch, the free-wheel hub mechanism would act to prevent rotation of the auxiliary drive wheels (actually serving as driven wheels) from being transmitted to the front axle driveshaft, thus avoiding undesired inertial moment (energy loss) at the front axle from being produced. Generally, a meshable pair of gears are provided in such a free-wheel hub mechanism, for connecting the axle driveshaft to the hub and for disconnecting the axle driveshaft from the hub. One of the meshable pair is a fixed gear firmly fitted onto the endmost portion of the axle driveshaft for rotation together therewith, and the other is an axially movable ring gear disposed in a housing hermetically covering the endmost portion of the axle driveshaft for rotation together with the hub. Generally known, the movable ring gear connected to the wheel hub side is brought into meshed-engagement with the fixed gear by way of one axial sliding movement of the movable ring gear in a first axial direction, while the movable ring gear is disengaged from the axle driveshaft by way of the other axial sliding movement of the movable ring gear in a second axial direction opposite to the first axial direction. There are two general types of free-wheel hub mechanisms: a manual type and an automatic type. In the manual free-wheel hub mechanism, the engagement and disengagement between the axle driveshaft and the hub are manually operated. In the automatic free-wheel hub mechanism, the engaging action and the disengaging action are automatically achieved by means of a sliding mechanism, utilizing air-pressure, hydraulic-pressure or the like. Alternatively, the sliding mechanism for the movable gear often includes a motor-driven gear train.

In such a part-time four-wheel-drive vehicle employing a free-wheel hub mechanism as well as a transfer, in the event that the movable gear is not satisfactorily brought into meshed-engagement with the fixed gear owing to failure in a sliding mechanism of the free-wheel hub mechanism operably disposed in the housing even when the drive mode of the vehicle is shifted from the two-wheel-drive mode to the four-wheel-drive mode by the transfer, the drive mode remains at the two-wheel-drive mode. As set out above, there is a problem in that the failure in the sliding mechanism disturbs a smooth switching action from the two-wheel-drive mode to the four-wheel-drive mode or vice versa. For the reasons indicated above, it is very advantageous to inform the driver of the operating state of the free-wheel hub mechanism. Japanese Utility-Model Provisional Publication (Jikkai Showa) No. 64-52815 discloses detecting the operating state of an automatic free-wheel hub mechanism by way of switched-ON and switched-OFF states of a plurality of limit switches. However, the prior art detecting system of the free-wheel hub mechanism requires a troublesome wiring for a signal line, which is electrically connected to the limit switch provided in the housing. For the purpose of assembling the signal line and the limit switch in the housing, a size of the housing tends be large-sized, thus resulting increased production costs. In the Japanese Utility-Model Provisional Publication No. 64-52815, since the sliding mechanism included in the automatic free-wheel hub comprises a motor-driven gear train composed of a plurality of small-sized gears, the size of the housing tends to be further increased. Additionally, in case of failure in the limit switch itself or breakage in the signal line, it is impossible to detect abnormality of the switching action of the free-wheel hub mechanism. In this case, a detecting mechanism for the failure in the limit switch or the breakage in the signal line must be further provided, thereby resulting in a further increased size of the housing and thus increased manufacturing costs of the detecting system for the operating state of the free-wheel hub.

SUMMARY OF THE INVENTION

Accordingly, it is an object of the invention to provide an improved operating-state detecting system of a free-wheel hub mechanism for a four-wheel-drive vehicle that avoids the foregoing disadvantages of the prior art.

It is another object of the invention to provide an operating-state detecting system of a free-wheel hub mechanism, capable of detecting the operating state of the free-wheel hub mechanism without enlarging the housing accommodating the free-wheel hub mechanism, and also eliminating a detector such as a limit switch and a troublesome wiring of its signal line.

In order to accomplish the aforementioned and other objects of the invention, a system for detecting an operating state of an automobile free-wheel hub mechanism that connects and disconnects a driveshaft to and from a wheel hub by engaging and disengaging a first member fixed onto the driveshaft for rotation with the driveshaft with and from a second member slidably disposed in the wheel hub and rotatable with the wheel hub, comprises first sensor means for detecting a revolution speed of a road wheel having the wheel hub to generate a wheel-speed indicative signal, second sensor means for detecting a revolution speed of the driveshaft to generate a driveshaft revolution-speed indicative signal, and detection means for detecting an operating state of the free-wheel hub mechanism on the basis of a deviation between a value of the wheel-speed indicative signal from the first sensor means and a value of the driveshaft revolution-speed indicative signal from the second sensor means. The free-wheel hub mechanism is provided in each of auxiliary drive wheels of a four-wheel-drive vehicle equipped with a transfer through which a two-wheel-drive mode and a four-wheel-drive mode are switchable, for connecting and disconnecting a driveshaft of each of the auxiliary drive wheels to and from a wheel hub associated with the driveshaft when switching from one of the two-wheel-drive mode and the four-wheel-drive mode to another. The detection means determines a presence of abnormality in the free-wheel hub mechanism when a drive mode of the four-wheel-drive vehicle is shifted to the two-wheel-drive mode via the transfer and at least one of a first deviation between a value of the wheel-speed indicative signal from the first sensor means attached to a first drive wheel of the auxiliary drive wheels and a value of the driveshaft revolution-speed indicative signal from the second sensor means attached to a driveshaft associated with the first drive wheel and a second deviation between a value of the wheel-speed indicative signal from the first sensor means attached to a second drive wheel of the auxiliary drive wheels and a value of the driveshaft revolution-speed indicative signal from the second sensor means attached to a driveshaft associated with the second drive wheel is less than or equal to a predetermined threshold value. Also, the detection means determines a presence of abnormality in the free-wheel hub mechanism when a drive mode of the four-wheel-drive vehicle is shifted to the four-wheel-drive mode via the transfer and at least one of a first deviation between a value of the wheel-speed indicative signal from the first sensor means attached to a first drive wheel of the auxiliary drive wheels and a value of the driveshaft revolution-speed indicative signal from the second sensor means attached to a driveshaft associated with the first drive wheel and a second deviation between a value of the wheel-speed indicative signal from the first sensor means attached to a second drive wheel of the auxiliary drive wheels and a value of the driveshaft revolution-speed indicative signal from the second sensor means attached to a driveshaft associated with the second drive wheel is greater than a predetermined threshold value.

According to another aspect of the invention, a system for detecting an operating state of a free-wheel hub mechanism for a four-wheel-drive vehicle, which mechanism connects and disconnects a driveshaft to and from a wheel hub by engaging and disengaging a fixed gear firmly connected onto the driveshaft for rotation with the driveshaft with and from a movable gear slidably splined to an inner periphery of the wheel hub and rotatable with the wheel hub, comprises first sensor means for detecting a revolution speed of a first wheel of auxiliary drive wheels each having the wheel hub and a revolution speed of a second wheel of the auxiliary drive wheels to generate first and second wheel-speed indicative signals, second sensor means for detecting a revolution speed of the driveshaft associated with the first wheel and a revolution speed of the driveshaft associated with the second wheel to generate first and second driveshaft revolution-speed indicative signals, and detection means for detecting an operating state of the free-wheel hub mechanism depending on a first deviation between a value of the first wheel-speed indicative signal and a value of the first driveshaft revolution-speed indicative signal and a second deviation between a value of the second wheel-speed indicative signal and a value of the second driveshaft revolution-speed indicative signal, so that the detecting means determines a presence of abnormality in at least one of the free-wheel hub mechanisms when a drive mode of the four-wheel-drive vehicle is shifted to the two-wheel-drive mode via the transfer and at least one of a first deviation between a value of the first wheel-speed indicative signal and a value of the first driveshaft revolution-speed indicative signal and a second deviation between a value of the second wheel-speed indicative signal and a value of the second driveshaft revolution-speed indicative signal is less than or equal to a first predetermined threshold value and when the drive mode is shifted to the four-wheel-drive mode via the transfer and at least one of the first and second deviations is greater than the first predetermined threshold value. The system may further comprise third sensor means for detecting a revolution speed of a first propeller shaft connected to the auxiliary drive wheels and a revolution speed of a second propeller shaft connected to main drive wheels to generate first and second propeller-shaft revolution-speed indicative signals and means for inhibiting the movable gear being engaged with and disengaged from the fixed gear in each of the free-wheel hub mechanisms in case that a third deviation between a value of the first propeller-shaft revolution-speed indicative signal and a value of the second propeller-shaft revolution-speed indicative signal is greater than a second predetermined threshold value when the drive mode is shifted from one of the two-wheel-drive mode and the four-wheel-drive mode to another.

According to a further aspect of the invention, a system for detecting an operating state of an air-pressure operated free-wheel hub mechanism for a four-wheel-drive vehicle, which mechanism connects and disconnects a driveshaft to and from a wheel hub by engaging and disengaging, via air pressure, a fixed gear firmly connected onto the driveshaft for rotation with the driveshaft with and from a movable gear slidably splined to an inner periphery of the wheel hub and rotatable with the wheel hub and biased to a spring-loaded position, the air pressure being generated by an air pump and supplied to a pressure chamber facing the movable gear for sliding the movable gear against a spring load, comprises a pressure switch responsive to a pressure level of a discharge pressure of air discharged from the air pump so that the pressure switch is switched ON when the discharge pressure is less than a predetermined pressure level and switched OFF when the discharge pressure is greater than or equal to the predetermined pressure level, the pressure switch generating a signal representative of switched-ON and switched-OFF states of the pressure switch, first sensor means for detecting a revolution speed of a first wheel of auxiliary drive wheels each having the wheel hub and a revolution speed of a second wheel of the auxiliary drive wheels to generate first and second wheel-speed indicative signals, second sensor means for detecting a revolution speed of the driveshaft associated with the first wheel and a revolution speed of the driveshaft associated with the second wheel to generate first and second driveshaft revolution-speed indicative signals, first detection means for detecting an operating state of the free-wheel hub mechanism depending on a first deviation between a value of the first wheel-speed indicative signal and a value of the first driveshaft revolution-speed indicative signal and a second deviation between a value of the second wheel-speed indicative signal and a value of the second driveshaft revolution-speed indicative signal, so that the first detecting means determines a presence of abnormality in at least one of the free-wheel hub mechanisms when a drive mode of the four-wheel-drive vehicle is shifted to the two-wheel-drive mode via the transfer and at least one of a first deviation between a value of the first wheel-speed indicative signal and a value of the first driveshaft revolution-speed indicative signal and a second deviation between a value of the second wheel-speed indicative signal and a value of the second driveshaft revolution-speed indicative signal is less than or equal to a first predetermined threshold value and when the drive mode is shifted to the four-wheel-drive mode via the transfer and at least one of the first and second deviations is greater than the first predetermined threshold value, and second detection means for monitoring a first time interval ranging from a first leading edge of the signal from the pressure switch to a first trailing edge of the signal which first trailing edge follows the first leading edge and a second time interval ranging from the first trailing edge of the signal to a second leading edge of the signal which second leading edge follows the first trailing edge, the second detection means determining that there is excessive air-leakage in case that the pressure switch remains switched ON after the first time interval reaches a first predetermined value, and the second detection means determining that there is slight air-leakage in case that the pressure switch is shifted from the switched-OFF state to the switched-ON state before the second time interval reaches a second predetermined value.

DESCRIPTION OF THE PREFERRED EMBODIMENTS

Figure 1:
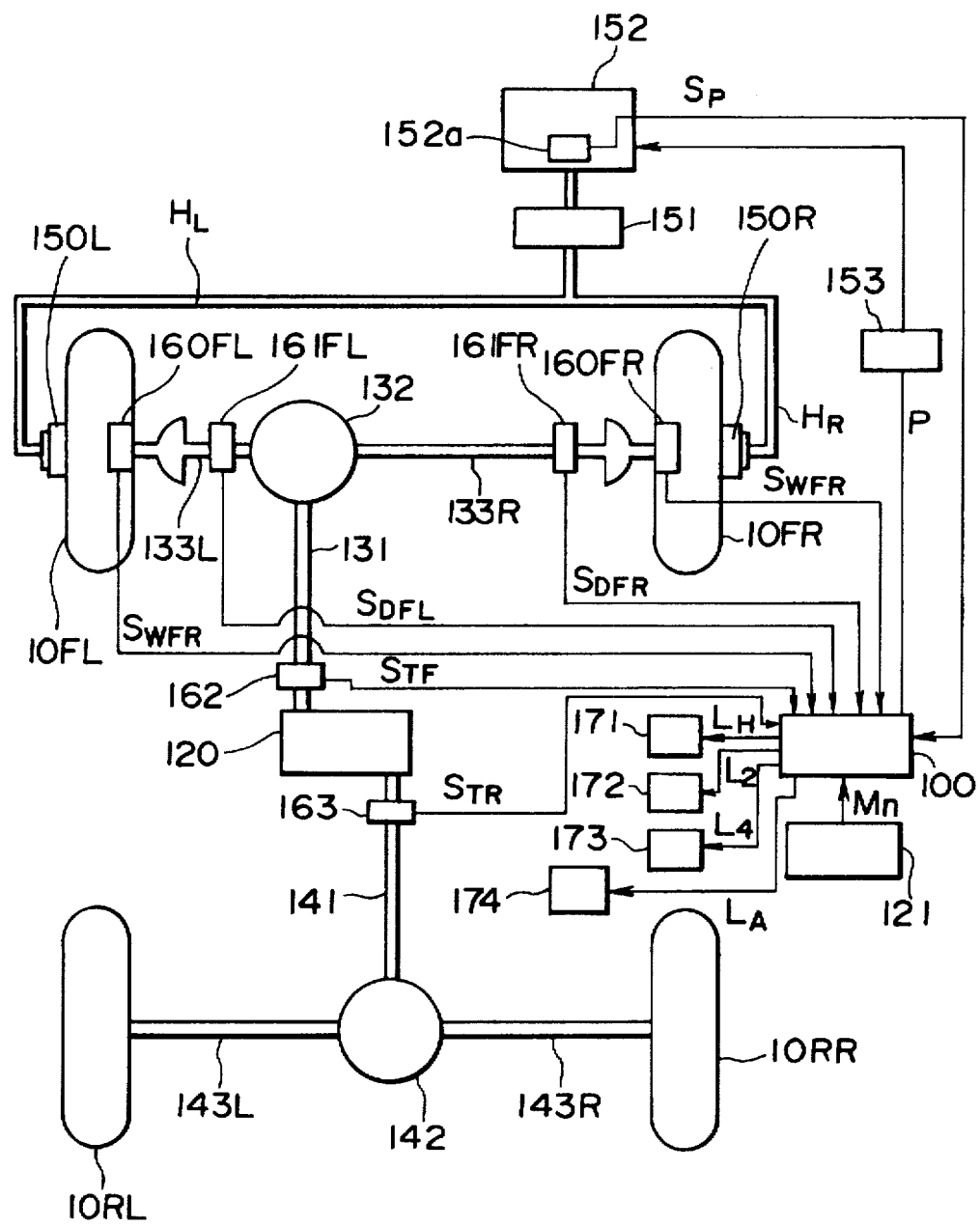
FIG. 1 is a schematic system diagram illustrating a part-time four-wheel-drive vehicle employing an operating-state detecting system of a free-wheel hub mechanism, made according to the present invention.

Referring now to the drawings, particularly to FIG. 1, the detecting system of the operating state of the free-wheel hub of the invention is exemplified in case of a so-called part-time front-engine four-wheel-drive vehicle usually operated in a rear wheel drive mode in which the engine power is transmitted through a transfer only to the rear drive wheels. That is, rear-left and rear-right drive wheels 10RL and 10RR serve as main drive wheels, whereas front-left and front-right drive wheels 10FL and 10FR serve as auxiliary drive wheels. As seen in FIG. 1, a left-hand side free-wheel hub mechanism 150L is provided in the front-left drive wheel 10FL, while a right-hand side free-wheel hub mechanism 150R is provided in the front-right drive wheel 10FR. Although it is not clearly shown in FIG. 1, the four-wheel-drive vehicle traditionally employs a transfer 120 for distributing engine power (driving torque produced by an engine (not shown) and transmitted through a transmission (not shown) to the transfer) between front axle driveshafts connected to the front-left and front-right drive wheels 10FL and 10FR and rear axle driveshafts connected to the rear-left and rear-right drive wheels 10RL and 10RR. In the shown embodiment, the transfer 120 is responsive to the switching operation of a 2WD-and-4WD shifting switch (a 2WD⇌4WD mode-selection switch) 121. The 2WD-and-4WD shifting switch 121 is designed to generate a selected mode indicative signal Mn having a signal value of "2" when the two-wheel-drive mode is selected by the switch 121, and generates the signal Mn having a signal value of "4" when the four-wheel-drive mode is selected by the switch 121. The transfer 120 operates to adjust the driving-torque distribution ratio between the front and rear drive wheels toward 0%:100% when the two-wheel-drive (2WD) mode is selected by the switch 121, and to adjust the distribution ratio toward 50%:50% when the four-wheel-drive (4WD) mode is selected. In the presence of selection of the four-wheel-drive mode, the front-wheel driving torque delivered by the transfer 120 is transmitted through a front-wheel side propeller shaft 131, a front-wheel side differential 132 and front-left and front-right axle driveshafts 133L and 133R to the front-left and front-right drive wheels 10FL and 10FR, whereas the rear-wheel driving torque delivered by the transfer 120 is transmitted through a rear-wheel side propeller shaft 141, a rear-wheel side differential 142 and rear-left and rear-right axle driveshafts 143L and 143R to the rear-left and rear-right drive wheels 10RL and 10RR. In the presence of selection of the two-wheel-drive mode, the engine power is all delivered through the transfer 120, the rear propeller shaft 141, the rear differential 142 and the rear-left and rear-right axle driveshafts 143L and 143R to the rear-left and rear-right drive wheels 10RL and 10RR. As may be appreciated from FIGS. 1 and 2, in the shown embodiment, an air-pressure operated free-wheel hub mechanism is applied to both the left-hand side and right-hand side free-wheel hub mechanisms 150L and 150R. As detailed later, in order to produce a sliding movement of a movable gear 42 by virtue of air pressure, the left-hand side free-wheel hub mechanism 150L is connected to an air pump 152 through a left-hand side air-pressure line HL and a drier 151, whereas the right-hand side free-wheel hub mechanism 150R is connected to the air pump 152 through a right-hand side air-pressure line HR and the drier 151. The drier 151 is provided in the air-pressure line in the vicinity of the outlet of the air pump 152 for removing any moisture contained in compressed air discharged from the pump 152.

Figure 2:
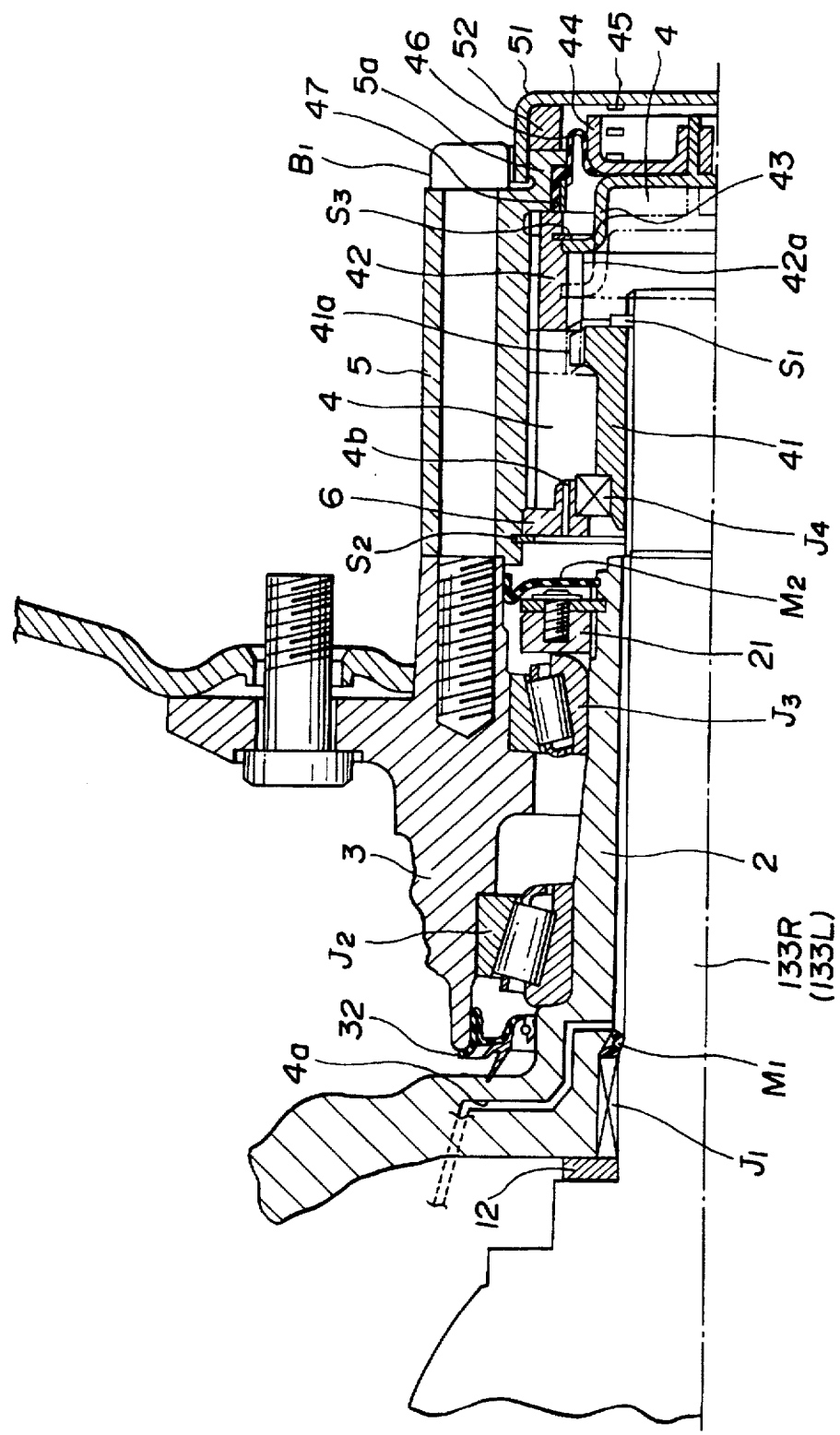
FIG. 2 is a longitudinal cross-sectional view illustrating the free-wheel hub mechanism of one embodiment.

Referring now to FIG. 2, there is shown a detail of the free-wheel hub mechanisms 150L and 150R. The respective free-wheel hub mechanism includes a substantially cylindrical wheel hub 3 rotatably supported on a pair of bearings namely an inner tapered roller bearing J2 and an outer tapered roller bearing J3 both fitted onto the outer periphery of a knuckle spindle 2 having a substantially cylindrical hollow, a substantially cylindrical housing 5 provided at the end of the axle driveshaft 133R (133L) for hermetically covering the endmost portion of the driveshaft in an air-tight fashion, and a connection-and-disconnection mechanism operably provided in the housing 5 for connecting the driveshaft 133R (133L) to the hub 3 and for disconnecting the driveshaft 133R (133L) from the hub 3. The hub 3 and the housing 5 are firmly secured to each other by means of a plurality of wheel mounting stud hub bolts B1 in a conventional manner. As seen in FIG. 2, the driveshaft 133R (133L) is inserted into the cylindrical hollow of the knuckle spindle 2 through a bearing J1 fitted onto the inner peripheral wall of the knuckle spindle. The above-noted connection-and-disconnection mechanism comprises a fixed gear 41 fixedly connected onto the outer periphery of the endmost portion of the driveshaft 133R (133L), a movable ring gear 42 splined to the inner periphery of the substantially cylindrical housing 5, and a piston 43 slidably disposed in the internal space defined in the housing 5 and attached to the inner periphery of the movable gear 42 by way of a retaining ring S3 for producing an axial sliding movement of the movable gear 42 by virtue of the stroke of the piston. The inner race of a bearing J4 is fitted onto the stepped cylindrical portion of the fixed gear 41, while the outer race of the bearing J4 is fitted into the inner periphery of a bearing mount ring 6 which ring is fitted into the inner periphery of the housing 5. The inward axial movement of the sub-assembly consisting of the bearing mount ring 6, the bearing J4 and the fixed gear 41 is prevented by means of a stopper ring S2 fitted onto the inner periphery of the housing 5, whereas the outward axial movement of the sub-assembly is prevented by means of a stopper ring S1 fitted onto the outer periphery of the endmost portion of the driveshaft 133R (133L). As a result of this, the fixed gear 41 is rotatably supported with respect to the housing 5, and additionally the axial sliding movement of the fixed gear 41 is prevented in both axial directions. As clearly seen in FIG. 2, the bearing mount ring 6 is formed with an axial through-opening 4b intercommunicating two air chambers defined in the front and rear of the bearing mount ring 6, namely an internal pressure chamber 4 defined between the inner peripheral wall of the housing 5 and the top end of the driveshaft 133R (133L) and the outer periphery of the fixed gear 41 and a substantially annular air chamber defined between the stopper ring S2 and a diaphragm seal M2. The knuckle spindle 2 is formed with an air-pressure supply passage 4a for supplying compressed air discharged from the pump 152 into an essentially cylindrical clearance defined between the inner periphery of the knuckle spindle 2 and the outer periphery of the driveshaft 133R (133L) inserted into the knuckle spindle 2. Thus, compressed air discharged from the outlet of the pump 152 is delivered through the passage 4a, the cylindrical clearance in the knuckle spindle 2, the air chamber facing the left-hand side flat surface of the bearing mount ring 6 and the axial through-opening 4b to the internal pressure chamber 4. The piston 43 which is fixed to the movable gear 42 by the retaining ring S3, is permanently biased in the leftward direction (viewing FIG. 2) by means of a return spring 45 such as a coiled compression spring, so as to establish meshed-engagement between the fixed gear 41 and the movable gear 42. Actually, as seen in the rightmost portion of FIG. 2, the piston 43 is pressed leftward through a pressure plate 44 which is serves as a spring seat receiving one end of the return spring 45. The other end of the return spring 45 is supported on the inner wall of a center cap 51 which is provided for preventing dust entry or muddy-water entry into the interior of the housing 5. The center cap 51 is hermetically fitted onto the outer periphery of the stepped portion 5a of the housing 5 in a gas-tight fashion in cooperation with a ring-shaped gas-tight seal 52. In the shown embodiment, to enhance the sealing performance, a diaphragm seal 46 is fitted onto the inner periphery of the stepped portion 5a of the housing 5 by means of a retaining ring 47.

With the above-noted arrangement, the engaging action between the driveshaft 133R (133L) and the hub 3 can be attained by meshing the toothed portion 41a of the fixed gear 41 with the toothed portion 42a of the movable ring gear 42, while the disengaging action of the driveshaft 133R (133L) from the hub 3 can be attained by unmeshing the toothed portion 41a and the toothed portion 42a each other. Concretely, in the case that the driveshaft 133R (133L) is disengaged from the hub 3, pressurized air is supplied from the air pump 152 through the air-pressure passage 4a, the cylindrical clearance defined between the knuckle spindle and the driveshaft, the annular air chamber facing the bearing mount ring and the axial through-opening 4b to the internal pressure chamber 4 defined in the housing 5 and between the piston 43 and the driveshaft end. Thus, the pressure level of air in the pressure chamber 4 gradually increases and then the piston 43 shifts rightward (viewing FIG. 2) against the bias of the spring 45 under air-pressure increased, with the result that the toothed portion 42a of the movable gear becomes disengaged from the toothed portion 41a of the fixed gear, and thus the rotational movement of the front drive wheels 10FR (10FL) is not be transmitted to the driveshaft 133R (133L). In contrast to the above, in the case that the driveshaft 133R (133L) is engaged again with the hub 3, the air supply from the pump 152 is stopped and thus the air pressure in the pressure chamber 4 is reduced down to atmospheric pressure. As a result, the piston 43 moves toward the spring-biased position in the leftward axial direction (viewing FIG. 2) by means of the spring 45, and thus the toothed portion 42a of the movable gear of the wheel-hub side is brought into meshed-engagement with the toothed portion 41a of the fixed gear of the driveshaft side, as indicated by the phantom line of FIG. 2. With the gears 41 and 42 in mesh, the rotational movement of the driveshaft 133R (133L) is transmitted through the two gears 41 and 42 and the housing 5 to the hub 3. Under these conditions, the driving torque of driveshaft 133R (133L) can be transmitted to the front drive wheels 10FR (10FL). in the shown embodiment, as seen in FIG. 2, a ring-shaped sealing member 12 is disposed between the driveshaft 133R (133L) and the opening end of the flanged portion of the knuckle spindle 2 and also an oil seal 32 is disposed between the outer periphery of the knuckle spindle 2 and the inner opening end of the hub 3, for preventing dust entry, muddy-water entry or grease entry through the bearing J1 into the cylindrical clearance defined between the inner periphery of the knuckle spindle 2 and the outer periphery of the driveshaft and into the interior of the hub 3. Additionally, in order to enhance the gas-tightness of the pressure chamber 4, a ring-shaped diaphragm seal M1 is disposed between the inner periphery of the knuckle spindle 2 and the outer periphery of the driveshaft 133R (133L) to prevent leakage of air from the air-pressure passage 4a and the above-noted cylindrical clearance through the bearing J1 to the outside. Also, the other diaphragm seal M2 is disposed between the endmost portion of the knuckle spindle 2 and the outer opening end of the hub 3 to prevent air leakage from the pressure chamber 4 through the axial through-opening 4b to the interior space of the hub 3. With the above-mentioned sealing structure, air pressure in the pressure chamber 4 can be efficiently maintained at a desired pressure level. The switching action of the respective free-wheel hub mechanisms 150L and 150R is controlled by a controller 100 shown in FIG. 1. As hereinbelow described in detail, detection of the operating state of the respective free-wheel hub mechanism and detection of undesired leakage of air to be supplied to the pressure chamber 4 are both achieved via the controller 100.

Referring again to FIG. 1, a front-left wheel-speed sensor 160FL and a front-right wheel-speed sensor 160FR are respectively provided at the front-left and front-right wheels 10FL and 10FR for detecting revolution speeds of the respective front wheels. A front-left axle driveshaft revolution-speed sensor 161FL and a front-right axle driveshaft revolution-speed sensor 161FR are respectively provided at the front-left and front-right axle driveshafts 133L and 133R for detecting revolution speeds of the respective front axle driveshafts. A front propeller shaft revolution-speed sensor 162 and a rear propeller shaft revolution-speed sensor 163 are respectively provided at the front and rear propeller shafts 131 and 141 for detecting revolution speeds of the respective propeller shafts. Each of the sensors 160FL, 160FR, 161FL, 161FR, 162 and 163 is comprised of a sensor rotor having a serrated portion on the outer periphery thereof, and a pickup which accommodates therein a magnet and a coil for detecting changes in induced electromotive force resulting from the magnetic field (magnetic flux) produced by the magnet when the pickup is installed opposite to the serrated portion of the associated sensor rotor. In case of the wheel speed sensors 160FL and 160FR, the brake disk is often used as the sensor rotor. In case of the driveshaft revolution-speed sensors 161FL and 161FR and the propeller shaft revolution-speed sensors 162 and 163, the sensor rotor is traditionally fixed on the outer periphery of the associated driveshaft or the associated propeller shaft, whereas the pickup is mounted on the vehicle body so that the magnet of the pickup is disposed close to and opposite to the serrated portion of the sensor rotor. In this manner, the induced electromotive force of frequencies proportional to revolutions of the serrated portion of the rotor is detected by the pickup as the revolution speed of the road wheel, the driveshaft or the propeller shaft. Also fluidly disposed in the air pump 152 is a pressure switch 152a which switch is responsive to a pressure level of the discharge pressure of air discharged from the outlet of the air pump 152, such that the pressure switch 152a is switched ON when the discharge pressure is less than a predetermined pressure level and such that the pressure switch 152a is switched OFF when the discharge pressure is above the predetermined pressure level. As can be appreciated, by means of the pressure switch 152a, the discharge pressure from the air pump 152 can be held substantially at the desired pressure level. The switched-ON and switched-OFF indicative signal SP (which will be hereinafter abbreviated to an "ON/OFF signal SP") from the pressure switch 152a is output to the input interface of the controller 100. In the shown embodiment, the ON/OFF signal SP is held at a high signal level such as "1" when the pressure switch 152 is switched ON, whereas the ON/OFF signal SP is held at a low signal level such as "0" when the pressure switch 152a is switched OFF. In order to drive the air pump 152, electric power is supplied to an electric motor of the air pump 152 through a pump control relay 153 connected to the controller 100. Although it is not clearly shown, in a conventional manner, the power is delivered through the relay 153 to the electric motor of the air pump when the exciting coil of the relay 153 is energized by a comparatively high exciting current greater than a predetermined high current value. The power supply to the motor of the air pump is stopped by the fully-opened relay 153, when the exciting coil of the relay is de-energized by a comparatively low exciting current below a predetermined low current value such as zero. For the purpose of simplification of the disclosure, let it be supposed that the relay 153 is energized when a control signal P from the output interface of the controller 100 is "1" (i.e., P=1), whereas the relay 153 is de-energized when the control signal P is "0" (i.e., P=0). Also provided in the instrument panel of the vehicle are a free-wheel hub operating-state indicating lamp 171 abbreviated to a "HUB lamp", a two-wheel-drive mode indicating lamp 172 abbreviated to a "2WD lamp", a four-wheel-drive mode indicating lamp abbreviated to a "4WD lamp" and an air-leakage pilot lamp 174 abbreviated to a "air-leakage lamp". The HUB lamp 171 is provided to indicate the operating state of the free-wheel hub mechanisms 150L and 150R, the 2WD lamp 172 and the 4WD lamp 173 are provided to indicate whether the vehicle is running at the two-wheel-drive mode or at the four-wheel-drive mode. The air-leakage lamp 174 is provided to indicate leakage of air from the air-flow passages disposed between the outlet of the air pump and the respective free-wheel hub mechanisms 150L and 150R. The HUB lamp 171 is responsive to a control signal LH from the controller 100 such that the HUB lamp 171 is turned ON in case of LH=1, such that the HUB lamp 171 is flashed in case of LH=2, and such that the HUB lamp 171 is turned OFF in case of LH=0. The 2WD lamp 172 is responsive to a control signal L2 from the controller 100, such that the lamp 172 is turned ON in case of L2=1, such that the lamp 172 is flashed in case of L2=2, and such that the lamp 172 is turned OFF in case of L2=0. Similarly, the 4WD lamp 173 is responsive to a control signal L4 from the controller 100, such that the lamp 173 is turned ON in case of L4=1, such that the lamp 173 is flashed in case of L4=2, and such that the lamp 173 is turned OFF in case of L4=0. On the other hand, the air-leakage lamp 174 is responsive to a control signal LA from the controller 100, such that the lamp 174 is turned ON in case of LA=1 and such that the lamp 174 is turned OFF in case of LA=0. In the shown embodiment, the controller 100 is comprised of a microcomputer. The controller 100 generally comprises the input interface having an analog-to-digital conversion function, a processor which executes arithmetic processing and control procedures according to predetermined programs, a buffer (memory) which memorizes the predetermined programs required for the above-noted processing and control procedures and stores processed results every predetermined intervals such as 20 msec, and the output interface which outputs the above-noted control signals LH, L2, L4, LA and P, based on the processed results. Actually, the input interface of the controller 100 receives a front-left wheel-speed indicative signal SWFL from the front-left wheel-speed sensor 160FL, a front-right wheel-speed indicative signal SWFR from the front-right wheel-speed sensor 160FR, a front-left axle driveshaft revolution-speed indicative signal SDFL from the front-left axle driveshaft revolution-speed sensor 161FL, a front-right axle driveshaft revolution-speed indicative signal SDFR from the front-right axle driveshaft revolution-speed sensor 161FR, a front propeller shaft revolution-speed indicative signal STF from the front propeller shaft revolution-speed sensor 162, a rear propeller shaft revolution-speed indicative signal STR from the rear propeller shaft revolution-speed sensor 163, the switched-ON or switched-OFF indicative signal SP from the pressure switch 152a, and the selected mode indicative signal Mn from the 2WD-and-4WD shifting switch 121. On the other hand, the output interface of the controller 100 is connected to the input terminal of the HUB lamp 171, the 2WD lamp 172, the 4WD lamp 173, the air-leakage lamp 174 and the relay 153, so as to output the control signals LH, L2, L4, LA and P, respectively. The controller 100 operates to control switching-ON, switching-OFF or flashing of each of the lamps 171, 172, 173 and 174 so as to detect abnormality in the operating state of the free-wheel hub mechanisms 150L and 150R and to detect leakage of air, as will be more fully described later in accordance with the flow charts shown in FIGS. 3 and 4. In the case of Mn=2, the controller 100 outputs a lighting indicative control signal L2=1 to the 2WD lamp 172, while outputting a switching-OFF indicative control signal L4=0 to the 4WD lamp 173. In the case of Mn=4, the controller outputs a switching-OFF indicative control signal L2=0 to the 2WD lamp 172, whereas a signal value of the control signal L4 from the controller 100 to the 4WD lamp 173 is different depending on the operating state of the free-wheel hub mechanisms 150L and 150R, as will be detailed later.

Briefly speaking, in the event that the 2WD mode (i.e., Mn=2) is selected by the switch 121 and thus the transfer 120 operates at the 2WD mode and additionally at least one of a first deviation |SWFL−SDFL| between the front-left wheel-speed indicative signal value SWFL and the front-left driveshaft revolution-speed indicative signal value SDFL and a second deviation |SWFR−SDFR| between front-right wheel-speed indicative signal value SWFR and the front-right driveshaft revolution-speed indicative signal value SDFR is less than or equal to a predetermined value A such as zero, the controller 100 determines that there is abnormality in the operating state of at least one of the free-wheel hub mechanisms 150L and 150R, because at least one of the free-wheel hubs remains connected to the associated driveshaft although the free-wheel hubs must be disconnected from the respective driveshafts in the case of Mn=2. In the case of selection of the two-wheel-drive mode (Mn=2) and the presence of abnormality in at least one of the free-wheel hub mechanisms, the controller 100 generates the control signal LH (=2) to the HUB lamp 171 to flash the HUB lamp 171, thus indicating the abnormality in the disconnecting action of the free-wheel hub mechanisms. In contrast, in the event that the 2WD mode (i.e., Mn=2) is selected by the switch 121 and additionally at least one of the first and second deviations |SWFL−SDFL| and |SWFR−SDFR| is above the predetermined value A, the controller 100 determines that there is no abnormality in the operating state of the free-wheel hub mechanisms 150L and 150R. In this case, the controller 100 outputs the control signal LH (=1) to the HUB lamp 171 so as to switch the lamp 171 ON. On the other hand, in the event that the 4WD mode (i.e., Mn=4) is selected by the switch 121 and thus the transfer 120 operates at the 4WD mode and additionally at least one of the first and second deviations |SWFL−SDFL| and |SWFR−SDFR| is above the predetermined value A, the controller 100 determines that there is abnormality in the operating state of at least one of the free-wheel hub mechanisms 150L and 150R, because at least one of the free-wheel hubs remains disconnected from the associated drive shaft although the free-wheel hubs must be fully connected to the respective driveshafts in the case of Mn=4. In this case, the controller 100 generates the control signal LH (=2) to the HUB lamp 171 to flash the lamp 171, thus indicating the abnormality in the connecting action of the free-wheel hub mechanisms, and simultaneously the controller 100 generates the control signal L4 (=2) to the 4WD lamp 173 to flash the lamp 173, thus indicating an abnormal condition of the drive line in which condition the normal four-wheel-drive state is not yet attained owing to the abnormality in the free-wheel hub mechanisms although a part of the power (driving torque) is delivered through the transfer 120 to the front propeller shaft 131 by selecting the two-wheel-drive mode by the switch 121. In contrast to the above, in the event that the 4WD mode (i.e., Mn=4) is selected by the switch 121 and additionally at least one of the first and second deviations |SWFL−SDFL| and |SWFR−SDFR| is less than or equal to the predetermined value A, the controller 100 determines that there is no abnormality in the operating state of the free-wheel hub mechanisms 150L and 150R and the driveshafts 133L and 133R are sufficiently connected to the respective wheel hubs 3, and thus the four-wheel-drive state is satisfactorily attained. In this case, the controller 100 outputs the control signal L4 (=1) to light the 4WD lamp 173 and also outputs the control signal LH (=0) to put out the HUB lamp 171.

Figure 3:
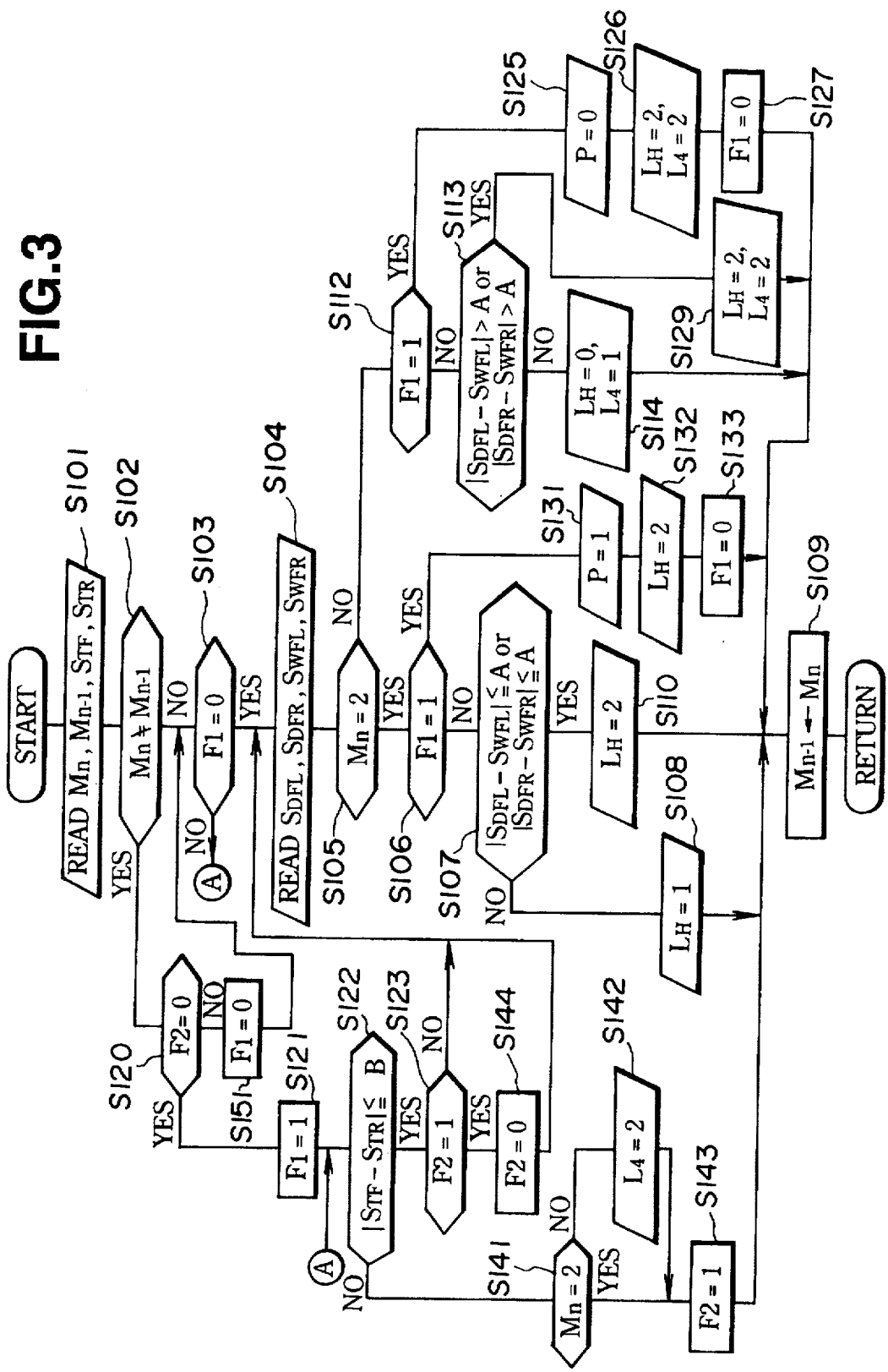
FIG. 3 is a flow chart illustrating an arithmetic proceeding executed in a controller employed in the detecting system of the embodiment for detecting the operating state of the free-wheel hub mechanism.

In addition to the above, for the purpose of connecting the hub to the driveshaft and of disconnecting the hub from the driveshaft through the associated free-wheel hub mechanism, the controller 100 outputs the control signal P to the pump control relay 153 based on the results obtained by the arithmetic processing shown in FIG. 3. Assuming that the signal value of the control signal P from the controller 100 is rapidly shifted from the value "0" to the value "1" during high-speed driving or during driving in which only the rear wheels tend to slip for the purpose of connecting the hub to the associated driveshaft, there may be occurred undesired shock and noise owing to rapid transmission of the driving torque from the rear wheels 10RL and 10RR to the front wheels 10FL and 10FR. In order to avoid undesired shock and noise, even when the mode-selection switch 121 switches the drive mode from the two-wheel-drive mode to the four-wheel-drive mode or vice versa, if a third deviation |STF−STR| between the front propeller shaft revolution-speed indicative signal value STF and the rear propeller shaft revolution-speed indicative signal value STR exceeds a predetermined value B, the controller 100 sets a 2WD⇌4WD switching-action inhibit-state indicative flag F2 to "1" (see step S143 of FIG. 3) without outputting the control signal P (=1). Thus, the free-wheel hub mechanisms 150L and 150R remains unchanged irrespective of the switching action between the 2WD mode and the 4WD mode. Under the above-noted particular condition wherein the 2WD⇌4WD switching-action inhibit-state indicative flag F2 is set to "1" just after the 4WD mode is selected, the controller 100 outputs the control signal L4 (=2) to the 4WD lamp 173 to flash the latter, thus permitting the flashing 4WD lamp 173 to indicate that the four-wheel-drive state is not yet attained. In the arithmetic processing shown in FIG. 3, the controller 100 determines the presence of the switching action between the 2WD mode and the 4WD mode on the basis of the fact that the current value Mn of the selected mode indicative signal is not equal to the previous value Mn−1 of the selected mode indicative signal, and then the controller sets a 2WD⇌4WD switching-state indicative flag F1 to "1". However, in the case that the 2WD⇌4WD switching-action inhibit-state indicative flag F2 is set to "1", the 2WD⇌4WD switching-state indicative flag F1 is reset to "0" (see step S151). In this manner, even when Mn≠Mn−1, the control routine is so designed to prevent the flow from step S102 to step S122 which step is necessary to determine whether or not the drive mode can be smoothly switched from one of the 4WD and 2WD modes to the other without any undesired shock and noise.

Figure 4:
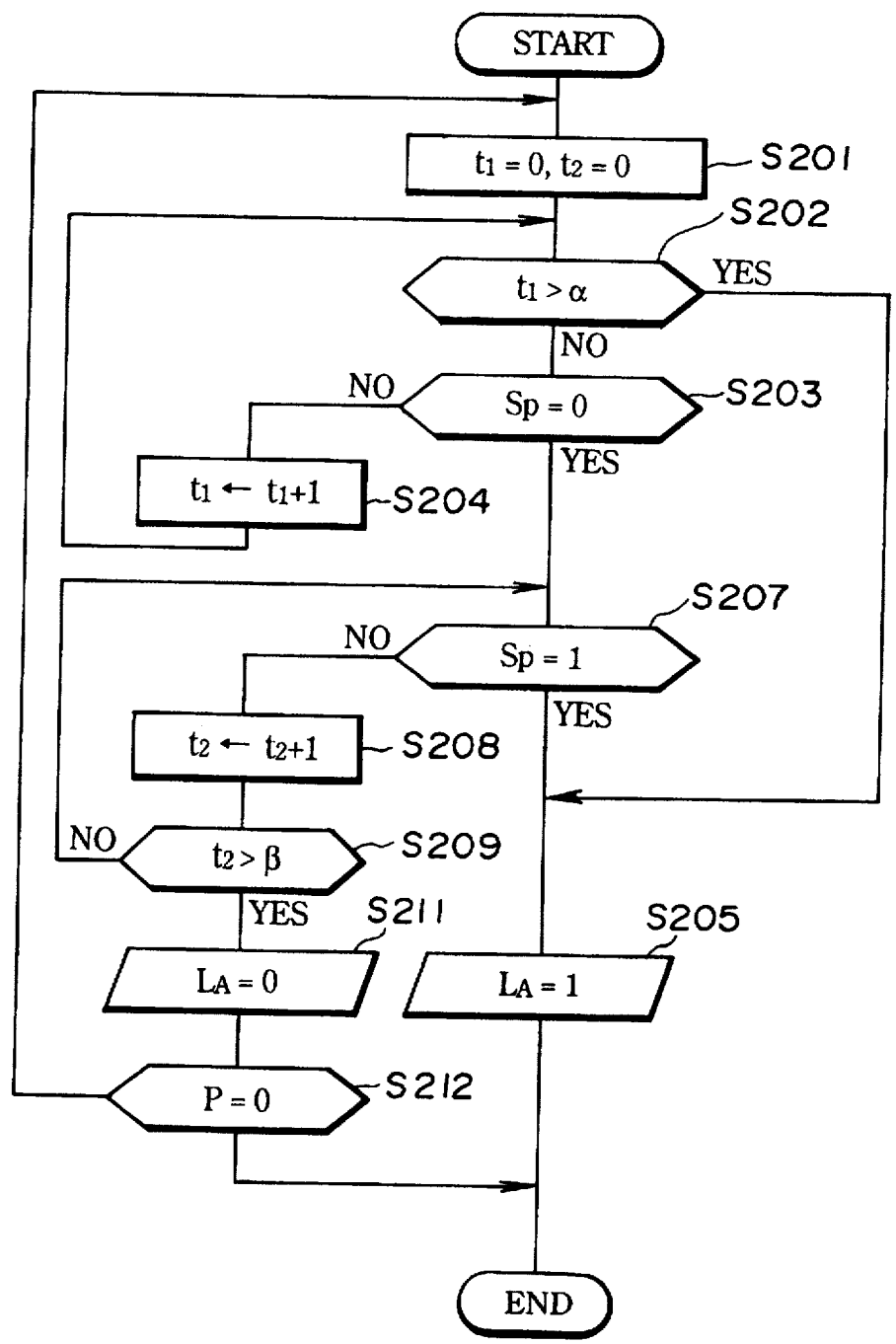
FIG. 4 is a flow chart illustrating another arithmetic proceeding executed in the controller for detecting leakage of air which is used for disengagement between the axle driveshaft and the hub.

Furthermore, the controller 100 executes the arithmetic processing or the sub-routine shown in FIG. 4, for the purpose of determining the presence of air-leakage resulting from failure in the air pump 152, breakage in the air-supply line, or lowering of the gas-tightness in the respective free-wheel hub mechanism. In order to quickly and reliably detect or estimate air-leakage occurred in the respective free-wheel hub mechanisms 150L and 150R, the controller 100 monitors two time intervals, one being a first time interval t1 ranging from a first leading edge of the ON/OFF signal SP of the pressure switch 152a to a first trailing edge following the first leading edge, and the other being a second time interval t2 ranging from the first trailing edge of the ON/OFF signal SP to a second leading edge following the first trailing edge. The first time interval t1 will be hereinbelow referred to as an "air-pump operative time interval", since the time interval t1 essentially corresponds to an operative time interval of the air pump 152. On the other hand, the second time interval t2 will be hereinbelow referred to as an "air-pump inoperative time interval", since the time interval t2 essentially corresponds to an inoperative time interval of the air pump 152. When the air-pump operative time interval t1 is greater than a predetermined value α, i.e., in case of t1>α, the controller 100 determines that there is excessive air-leakage due to failure in the air pump 152 or breakage in the air-pressure line, with the result that the controller 100 outputs the control signal LA (=1) to the air-leakage lamp 174 to light, the latter. Additionally, when the air-pump inoperative time interval t2 is less than or equal to a predetermined value β, i.e., in case of t2≦β, the controller 100 determines that there is slight air-leakage due to lowering of the gas-tightness in the free-wheel hub mechanisms, with the result that the controller outputs the control signal LA (=1) to the air-leakage lamp 174 to light the latter. In contrast, in case of t1≦α and t2>β, the controller 100 outputs the control signal LA (=0) to put out the air-leakage lamp 174. The monitoring operation of the two time intervals t1 and t2 is executed in synchronization with a timing of the switching-ON of the power to the pump 152. In other words, as soon as the control signal P for the relay 153 is shifted from "0" to "1", the sub-routine of FIG. 4 starts. On the other hand, the sub-routine shown in FIG. 3 is executed as time-triggered interrupt routines to be triggered every predetermined sampling time intervals ΔT such as 20 msec. Hereinbelow described in detail is the controlling operation of the controller 100 shown in FIGS. 3 and 4.

During the constant-speed driving at the two-wheel-drive mode, when the fixed gear 41 is held disengaged from the movable gear 42 in the respective free-wheel hub, first of all, at step 102 a test is made to determine whether the condition of Mn≠Mn−1 is satisfied on the basis of various detected values read at step S101, namely the current value Mn of the selected mode indicative signal, the previous value Mn−1 of the selected mode indicative signal, the front propeller shaft revolution-speed indicative signal value STF, and the rear propeller shaft revolution-speed indicative signal value STR. Under these conditions, since the mode-selection switch 121 is not operated, the current value Mn is equal to the previous value Mn−1. Thus, the procedure flows from step S102 to step S103 in which a test is made to determine whether or not the 2WD⇆4WD switching-state indicative flag F1 is "0". Since no switching operation of the switch 121 is made, the procedure shifts from step S103 to step S104 in which the front-left axle driveshaft revolution-speed indicative signal value SDFL, the front-right axle driveshaft revolution-speed indicative signal value SDFR, the front-left wheel-speed indicative signal value SWFL and the front-right wheel-speed indicative signal value SWFR are read. In step S105, a test is made to determine whether the current value Mn of the selected mode indicative signal is equal to "2", that is, the 2WD is selected. In step S106, a test is made to determine whether the 2WD⇆4WD switching-state indicative flag F1 is "1". Since the current value Mn is equal to "2" and additionally the flag F1 is equal to "0", the procedure flows from step S105 through step S106 to step S107, in that order. In step S107, a test is made to determine whether the first deviation |SWFL−SDFL| is less than or equal to the predetermined value A, or whether the second deviation |SWFR−SDFR| is less than or equal to the predetermined value A. As may be appreciated, during the normal constant-speed driving at the 2WD mode in which the wheel hub is completely disengaged from the associated drive shaft, since the front-left wheel-speed indicative signal value SWFL is above the front-left axle driveshaft revolution-speed indicative signal value SDFL, and the front-right wheel-speed indicative signal value SWFR is above the front-right axle driveshaft revolution-speed indicative signal value SDFR, the first and second deviations are both greater than the predetermined value A. The, the procedure flows from step S107 to step S108 in which the output interface of the controller 100 outputs the control signal LH (=1) to the HUB lamp 171 to light the lamp 171, and outputs the control signal L2 (=1) to the 2WD lamp 172 to light the lamp 172, and also outputs the control signal L4 (=0) to the 4WD lamp 173 to put out the lamp 173. Thereafter, step 109 proceeds in which the previous value Mn−1 of the selected mode indicative signal is updated by the current value Mn. In this case, since no switching operation is made by the switch 121, the selected mode indicative signal data remains unchanged, that is the previous value is maintained at "2". With the two lamps 171 and 172 switched ON and the lamp 173 switched OFF, the driver precisely recognizes that the vehicle is in the normal two-wheel-drive state in which all of the power is delivered to the main drive wheels (the rear drive wheels) through the transfer, the front-left wheel hub is completely disconnected from the front-left driveshaft and the front-right wheel hub is completely disconnected from the front-right driveshaft.

Under the above-noted condition, in the event that, in the front-right free-wheel hub mechanism 150R, the movable gear 42 is brought into meshed-contact with the fixed gear 41 owing to leakage of air, the procedure firstly flows from step S101 through steps S102, S103, S104, S105 and S106 to step S107, and then flows to step S110, since the first deviation |SWFL−SDFL| becomes equal to or less than the predetermined value A due to the front-left driveshaft revolution-speed indicative signal value SDFL essentially equal to the front-left wheel-speed indicative signal value SWFL. In this case, the controller 100 outputs the control signal LH (=2) to the HUB lamp 171 to flash the latter, and outputs the control signal L2 (=1) to the 2WD lamp 172 and also outputs the control signal L4 (=0) to the 4WD lamp 173, because of Mn=2. In this manner, since the 2WD lamp 172 remains in the lighting state and the HUB lamp 171 is changed from the lighting state to the flashing state, the driver recognizes that the wheel hub is not disconnected from the associated driveshaft owing to abnormality in at least one of the free-wheel hub mechanisms although the vehicle is in the two-wheel-drive state via the transfer.

On the other hand, when the vehicle is driving at a constant speed at the four-wheel-drive mode in which the movable gears 42 of the left and right free-wheel hubs are fully meshed with the respective fixed gears 41 of the driveshafts, there is no switching operation of the switch 121 and thus the 2WD⇆4WD switching-state indicative flag F1 is equal to "0". Therefore, the procedure flows from step S101 through steps S102, S103 and S104 to step S105. Since the current value Mn of the selected mode indicative signal is "4", that is Mn=4, the procedure jumps from step S105 to step S112 in which a test is made to determine whether the condition of F1=1 is satisfied in the same manner as step S106. Thereafter, step S113 proceeds because of no switching operation of the switch 121. In step S113, a test is made to determine whether the first deviation |SWFL−SDFL| is greater than the predetermined value A or whether the second deviation |SWFR−SDFR| is greater than the predetermined value A. During the normal constant-speed driving at the four-wheel-drive mode, since the first and second deviations are both below the predetermined value A, the procedure shifts from step S113 to step S114. In step S114, the controller 100 generates the control signal LH (=0) and the control signal L4 (=1) and the control signal L2 (=0), so as to put out the HUB lamp 171, and to light the 4WD lamp 173, and also to put out the 2WD lamp 172 (because of Mn=4). Thereafter, step 109 enters in which the current value Mn of the selected mode indicative signal is stored as the previous value Mn−1 in the buffer of the controller 100. With the HUB lamp 171 and the 2WD lamp 172 both switched OFF and the 4WD lamp switched ON, the driver recognizes that the vehicle is in the normal four-wheel-drive state in which in the front-wheel side (in the auxiliary-wheel side) the wheel hubs are completely connected to the respective driveshafts and additionally the power is distributed into the front and rear drive wheels through the transfer.

When the 2WD⇌4WD mode-selection switch 121 is switched from the 2WD mode to the 4WD mode during stable straight-ahead driving at a low speed in the 2WD mode, the power is delivered to the front propeller shaft 131 as well as the rear propeller shaft 141 via the transfer 120 and the current value Mn (=4) of the selected mode indicative signal is not equal to the previous value, Mn−1 (=2), that is Mn≠Mn−1. Thus, in the sub-routine shown in FIG. 3, the procedure jumps from step S102 to step S120. At this stage, since the procedure does not yet pass through step S143, the 2WD⇌4WD switching-action inhibit-state indicative flag F2 is still held at "0". Thus, step S121 proceeds in which the 2WD⇌4WD switching-state indicative flag F1 is set to "1" owing to shifting to the 4WD mode. Thereafter, step S122 proceeds in which a test is made to determine whether the third deviation |STF−STR| is equal to or less than the predetermined value B. Since the third deviation |STF−STR| is excessively less when the switch 121 is shifted to the four-wheel-drive mode during the stable low-speed driving, the answer to step S122 may be affirmative (YES). Thus, step S123 enters in which a test is made to determine whether or not the condition of F2=1 is satisfied. Since the flag F2 is still maintained at "0" and additionally Mn=4, the procedure shifts from step S123 through steps S104 and S105 to step S112, and then flows to step S125 because of F1=1. In step S125, a signal value of the control signal P to be fed to the pump control relay 153 is set at "0" to stop power-supply to the motor of the pump 152. At step S126, the controller outputs the control signal LH (=2) and the control signal L4 (=2) to flash both the HUB lamp 171 and the 4WD lamp 173. Also, the controller outputs the control signal L2 (=0) to put out the 2WD lamp 172 because of Mn=4. Thereafter, in step S127, the 2WD⇌4WD switching-state indicative flag F1 is reset to "0". Thereafter, the procedure shifts from step S127 to step S109 and then this routine terminates. With the HUB lamp 171 and the 4WD lamp 173 both flashing and the 2WD lamp 172 switched OFF, the driver recognizes that the drive mode is shifting from the two-wheel-drive state to the four-wheel-drive state. As soon as the control signal P is set to zero, the air pump 152 stops and thus air-supply to the pressure chamber 4 of each free-wheel hub mechanism is stopped. Soon, the pressure in the pressure chamber 4 becomes equal to atmospheric pressure. As a result of this, the piston 43 shifts in the axial leftward direction and thus the movable gear 42 is brought into meshed-engagement with the fixed gear 41 as indicated by the phantom line of FIG. 2. Rotation of the driveshaft 133R (133L) is transmitted via the gears 41 and 42 in mesh to the housing 5, and then transmitted to the wheel hub 3 fixedly secured to the housing 5 by means of the stud bolts B1. In this manner, the front-wheel side driveshafts 133R and 133L are fully coupled with the respective wheel hubs 3, and thus the driving torque delivered to the front propeller shaft 131 is transmitted through the driveshafts 133R and 133L to the front drive wheels 10FR and 10FL, with the result that the vehicle experiences a smooth transition from the two-wheel-drive state to the four-wheel-drive state. However, in the event that the driveshaft 133R (133L) is not fully coupled or engaged with the associated wheel hub 3 after power-supply to the pump 152 has been stopped through step S125, in the subsequent interrupt routine, the procedure flows from step S101 through steps S102, S103, S104, S105 and S112 to step S113, because of the conditions of Mn=Mn−1, F1=1 and Mn=4. In the case that two meshable pairs of gears 41 and 42 are not fully meshed with each other after stopping the air-supply, the first and second deviations |SWFL−SDFL| and |SWFR−SDFR| may be both greater than the predetermined value A. In such a case, since the answer to step S113 is affirmative (YES), the procedure flows to step S129 in which the controller generates the control signals LH (=2) and L4 (=2) and also generates the control signal L2 (=0) (because of Mn=4), so as to flash both the HUB lamp 171 and the 4WD lamp 173 and to put out the 2WD lamp 172. As a consequence, in the current sub-routine following the previous sub-routine time-triggered one cycle before, the controller continues to flash the lamps 171 and 173. Therefore, the driver recognizes that the vehicle is still transiting to the four-wheel-drive state. If the transition state from the two-wheel-drive state to the four-wheel-drive state continues for a long period of time, the driver recognizes that there is abnormality in the switching action of at least one of the free-wheel hub mechanisms 150L and 150R and thus the drive state of the vehicle is not yet transited to the four-wheel-drive state. In contrast to the above, in the case that there is no abnormality of the switching action of both of the free-wheel hub mechanisms, the two pairs of gears 41 and 42 will be brought into meshed-engagement with each other for a comparatively short time period, thus permitting the driveshafts 133R and 133L to be completely coupled with the wheel hubs 3. In this manner, as soon as the driveshafts has been completely connected to the respective hubs through the normal switching action of the free-wheel hub mechanisms 150L and 150R, the first and second deviations |SWFL−SDFL| and |SWFR−SDFR| become both below the predetermined value A. Thus, the procedure flows from step S113 to step S114 explained previously. As set forth above, during the transition from the two-wheel-drive state to the four-wheel-drive state during the stable low-speed driving, the HUB lamp 171 and the 4WD lamp 173 retain flashed. Just after the transition period, the HUB lamp 171 is rapidly changed from the flashing state to the switched-OFF state, whereas the 4WD lamp 173 is rapidly changed from the flashing state to the switched-ON state. Therefore, the driver recognizes that the drive state of the vehicle has been completely shifted to the four-wheel-drive state.

When the 2WD⇌4WD mode-selection switch 121 is switched from the 4WD mode to the 2WD mode during stable straight-ahead driving at a low speed in the 4WD mode, all of the power is delivered to the rear propeller shaft 141 via the transfer 120 and the current value Mn (=2) of the selected mode indicative signal is not equal to the previous value Mn−1 (=4), that is Mn≠Mn−1. In this case, as appreciated from the flow chart shown in FIG. 3, the procedure jumps from step S102 to step S120. At this stage, since the procedure does not yet pass through step S143, the 2WD⇌4WD switching-action inhibit-state indicative flag F2 is still held at "0". Therefore, step S121 proceeds in which the 2WD⇌4WD switching-state indicative flag F1 is set to "1" owing to shifting to the 2WD mode. Then, at step S122, the controller determines that the third deviation |STF−STR| is equal to or less than the predetermined value B, because the third deviation |STF−STR| is excessively less when the switch 121 is shifted to the two-wheel-drive mode during the stable low-speed driving. That is to say, the answer to step S122 is affirmative (YES), and thus step S123 proceeds. Since the flag F2 is still maintained at "0" and additionally Mn=2, the procedure shifts from step S123 through steps S104 and S105 to step S106. Since the flag F1 is "1" (see step S121), the procedure jumps from step S106 to step S131 in which a signal value of the control signal P for the pump control relay 153 is set at "1" to initiate power-supply to the motor of the pump 152. At step S132, the controller outputs the control signal LH (=2) to the HUB switch 171 to flash the latter. Additionally, owing to Mn=2, the controller outputs the control signal L2 (=1) to the 2WD lamp 172 and outputs the control signal L4 (=0) to the 4WD lamp, so as to light the 2WD lamp 172 and to put out the 4WD lamp 173. Thereafter, step S133 proceeds in which the 2WD⇌4WD switching-state indicative flag F1 is reset to "0". With the HUB lamp 171 shifted from the switched-OFF state to the flashing state, the 2WD lamp 172 shifted from the switched-OFF state to the switched-ON state and the 4WD lamp 173 shifted from the switched-ON state to the switched-OFF state, the driver can recognize that the wheel hubs start to disengage from the respective driveshafts by means of the left and right free-wheel hub mechanisms 150L and 150R. By way of the flow passing through step S131, the air pump 152 begins to rotate, and air-supply to the pressure chambers 4 of the respective free-wheel hub mechanisms 150L and 150R begins. That is, pressurized air is fed from the outlet of the pump 152 through the air-pressure supply passage 4a, the cylindrical clearance defined between the knuckle spindle 2 and the driveshaft 133R (133L), and the axial through-opening 4b formed in the bearing mount ring 6 to the respective pressure chamber 4. As a consequence, the air pressure in the chamber 4 increases, and thus the piston 43 moves away from the spring-loaded position against the spring bias. As seen in FIG. 2, the piston 43 shifts from the spring-loaded position indicated by the phantom line of FIG. 2 to the rightmost position indicated by the solid line of FIG. 2, with the result that the movable gear 42 is disengaged from the fixed gear 41. Under this condition, rotation of the front wheels 10FL and 10FR is not transmitted to the respective driveshafts 133L and 133R. However, in the event that the driveshaft 133R (133L) is not fully disengaged from the associated wheel hub 3 after initiation of power-supply to the pump 152 at S131, in the subsequent interrupt routine, the procedure flows from step S101 through steps S102, S103, S104, S105 and S106 to step S107, because of the conditions of Mn=Mn−1, F1=0 and Mn=2. Since the gears 41 and 42 are partly meshed with each other but not fully disengaged from each other, the first and second deviations |SWFL−SDFL| and |SWFR−SDFR| are both below the predetermined value A. Thus, the procedure flows from step S107 to step S110. In the same manner as step S132, according to the flow of steps S101 to S107 and S110, the controller continues to flash the HUB lamp 171, and to light the 2WD lamp 172 and to put out the 4WD lamp 173, in the current sub-routine following the previous sub-routine time-triggered one cycle before. Therefore, the driver recognizes that the disengagement between the wheel hub and the associated driveshaft is incomplete in at least one of the two free-wheel hub mechanisms, although the drive mode has been shifted to the 2WD mode by the switch 121. If the above-noted flashing state of the HUB lamp 171 continues for a long period of time, the driver recognizes that there is abnormality in the switching action of at least one of the free-wheel hub mechanisms 150L and 150R and thus disengagement between the hub and the driveshaft cannot be satisfactorily performed owing to an accident such as air leakage or the gears 41 and 42 jammed each other between the cylindrical housing 5 and the endmost portion of the driveshaft. In contrast, in the case that there is no abnormality of the switching action of both of the free-wheel hub mechanisms, the movable gear 42 will be smoothly rapidly disengaged from the fixed gear 41 for a short time period, thus permitting the driveshaft 133R (133L) to be completely disengaged from the hub 3. As soon as the driveshafts has been completely disconnected from the respective hubs through the normal switching action of the free-wheel hub mechanisms 150L and 150R, the first and second deviations |SWFL−SDFL| and |SWFR−SDFR| become both above the predetermined value A. Thus, the procedure flows from step S107 to step S108 discussed previously. As may be appreciated, during the transition from the four-wheel-drive state to the two-wheel-drive state during the stable low-speed driving, only the HUB lamp 171 retains flashed. Just after the transition period, the HUB lamp 171 is rapidly shifted from the flashing state to the lighting state. The driver can recognize that the wheel hubs have been completely disengaged from the respective driveshafts by virtue of the normal switching action of the free-wheel hub mechanisms and as a result the front-wheel rotation is not transmitted to the respective driveshafts 133L and 133R.

In case that the 2WD⇌4WD mode-selection switch 121 is switched from the two-wheel-drive mode to the four-wheel-drive mode, when at the two-wheel-drive mode the vehicle is in a high-speed driving or in a particular driving state wherein only the rear wheels tend to slip, a part of the power (driving torque) is delivered to the front propeller shaft 131 via the transfer 120. In such a case, during sampling of a first period of time in the interrupt routine shown in FIG. 3, the procedure flows from step S101 through steps S102, S120, and S121 to step S122, because of Mn≠Mn−1 (that is, the current value Mn of the selected mode indicative signal is "4", while the previous value Mn−1 is "2"), and F2=0. At the beginning of the switching operation from the 2WD mode to the 4WD mode, the driving torque is not sufficiently delivered to the front propeller shaft 131 via the transfer 120, and thus the third deviation |STF−STR| of the signal values STF and STR from the front and rear propeller shaft revolution-speed sensors 162 and 163 may be greater than the predetermined value B. Then, the procedure flows from step S122 to step S141 in which a test is made to determine whether the current value Mn of the selected mode indicative signal is equal to "2" or to "4". Actually, since the 4WD mode (M=4) is selected by the switch 121, the procedure shifts from step S141 to step S142. In step S142, the controller outputs the control signal L4 (=2) to the 4WD lamp 173 and simultaneously outputs the control signal L2 (=0) to the 2WD lamp 172, so as to flash the 4WD lamp 173 and to put out the 2WD lamp 172. Thereafter, step S143 proceeds in which the 2WD⇌4WD switching-action inhibit-state indicative flag F2 is set to "1". Then, the procedure flows from step S143 to step S109 in which the previous value Mn−1 (=2) of the selected mode indicative signal is updated by the current value Mn (=4). In the next interrupt routine following the above-mentioned interrupt routine, the procedure flows from step S101 to step S102. In step S102, since the previous value Mn−1 of the selected mode indicative signal has been already set to "4" through step S109 of the routine executed one cycle before and additionally, the mode-select switch 121 remains unchanged (that is, the current value Mn of the selected mode indicative signal is held at "4"), the answer to step S102 is negative (NO), and as a result step S103 enters. Then, the procedure jumps from step S103 to step S122, since the 2WD⇌4WD switching-state indicative flag F1 has been already set to "1" through step S121 of the previous routine executed one cycle before. If the third deviation

|STF−STR| is still greater than the predetermined value B, the previously-noted procedure will be repeatedly executed, until the third deviation becomes less than the predetermined value B. As may be appreciated from the above-noted flow from step S103 to S122, the controller inhibits the procedure from transiting from step S103 through step S104 to step S105, until the third deviation becomes less than the predetermined value B. As previously discussed, the flow from step S104 via steps S105 and S106 to step S131 is required for the actual switching procedure of the respective free-wheel hub mechanism for a transition period from the 4WD mode to the 2WD mode, whereas the flow from step S104 via steps S105 and S112 to step S125 is required for the actual switching procedure of the respective free-wheel hub mechanism for a transition period from the 2WD mode to the 4WD mode. Therefore, any switching action of the respective free-wheel hub mechanism 150L and 150R cannot be made, while the 2WD⇌4WD switching-action inhibit-state indicative flag F2 is set. In other words, in case of F2=1, the controller 100 acts to inhibit the wheel hub 3 from being engaged with the associated driveshaft even when the driving force is delivered to the front propeller shaft 131 through the transfer 120 depending on the selection of the 4WD mode. For instance, during high-speed driving at the 2WD mode, at the beginning of the switching operation of the switch 121 from the 2WD mode to the 4WD mode, the actual switching action of the respective free-wheel hub mechanism is inhibited owing to a comparatively great third deviation, thus avoiding undesired shock and noise resulting from rapid transmission of driving torque to the front wheels. Also, with the 4WD lamp 173 flashing (see step S142), the driver knows that the vehicle is actually in the two-wheel-drive state in spite of selection of the 4WD mode. When the above-noted driving state of the vehicle is changed to a usual, stable low-speed driving state, the third deviation |STF−STR| will be reduced and become equal to or less than the predetermined value B. At this time, the 2WD⇌4WD switching-action inhibit-state indicative flag F2 is reset to "0". That is, the procedure shifts from step S122 via step S123 to step S144, and then the flow from step S104 via steps S105 and S106 to step S131 (in case of Mn=2) or via steps S105 and S112 to S125 (in case of Mn=4) begins for the purpose of executing the 2WD⇌4WD switching action of the respective free-wheel hub mechanism. In the case that the condition of |STF−STR|>B and Mn=2 is satisfied when the switching operation of the switch 121 is made to the 2WD mode during driving at the 4WD mode, the procedure may flow from step S101 through steps S102, S120, S121, S122 and S141 to step S143. In the same manner as previously described, the 2WD⇌4WD switching-action inhibit-state indicative flag F2 is set to "1" until the third deviation becomes below the predetermined value B.

Alternatively, when the driver cancels the switching action of the 2WD⇌4WD mode-selection switch 121 under a particular condition of F2=1 just after shifting to the 4WD mode by the switch 121 during high-speed driving at the 2WD mode for example, the previous value Mn−1 of the selected mode indicative signal is set at "4" and the current value Mn is returned to "2" for a first period of sampling executed just after cancellation. Thus, in step S102, the controller determines that the condition of Mn≠Mn−1 is satisfied, and thus the procedure flows to step S120. However, during inhibition of the switching procedure of the respective free-wheel hub mechanisms, that is under the condition of F2=1, the procedure flows from step S120 to step S151 necessarily. In step S151, the 2WD⇌4WD switching-state indicative flag F1 is reset to "0". Then, step S103 proceeds, and then step S104 enters because of F1=0. Thereafter, the procedure flows from step S104 through steps S105 and S106 to step S107, since the current value Mn of the selected mode indicative signal is set to "2" and the flag F1 is set to "0". In this manner, the detecting procedure for the operating state of the respective free-wheel hub mechanism is initiated. Therefore, even when a determination of Mn≠Mn−1 is made at step S102 due to cancellation of the switching operation of the switch 121 during inhibition of the switching procedure of the respective free-wheel hub mechanisms, the control procedure never transfers to the switching procedure as indicated by a first series of steps S106, S131, S132 and S133 or a second series of steps S112, S125, S126 and S127, since the flag F1 is reset (see step S151). As a consequence, in the case of the above-noted cancellation, the flow from step S120 via step S151 to step S103 certainly avoids an accidental switching action of the respective free-wheel hub mechanisms.

Referring now to FIG. 4, this sub-routine begins at the same time when the electric power of the air pump 152 is turned ON.

In step S201, the air-pump operative time interval t1 and the air-pump inoperative time interval t2 are both initialized to "0".

In step S202, a test is made to determine whether or not the air-pump operative time interval t1 is greater than the predetermined value α. At the beginning of the routine, the procedure flows to step S203, because of t1=0 and t2=0. Likewise, since the discharge pressure from the pump 152 is still less than the desired pressure level, the pressure switch 152a remains switched ON and thus the ON/OFF signal SP of the pressure switch 152a is held at "1". Thus, since the condition of SP=0 is not satisfied, step S204 enters in which the current value of the air-pump operative time interval t1 is incremented by "1". Thereafter, the procedure returns to step S202. As appreciated, the flow from step S202 via steps S203 and S204 again to step S202 is repeatedly executed until the time interval t1 becomes greater than the predetermined value α or the ON/OFF signal SP becomes shifted to "0". For example, in the event that the discharge pressure from the pump 152 does not yet reach the desired pressure level owing to excessive air leakage although the time interval t1 has exceeded the predetermined value α, since the condition of t1>α is satisfied, the procedure jumps from step S202 to step S205 in which the controller outputs the control signal LA (=1) to the air-leakage lamp 174 so as to light the lamp 174. With the lamp 174 lighting, the driver recognizes that there is air leakage in the free-wheel hub mechanisms. Alternatively, in the case that there is no excessive air leakage and the discharge pressure from the pump has been reached the desired pressure level before the time interval t1 exceeds the predetermined value α, the pressure switch 152a is switched OFF and thus the ON/OFF signal SP is shifted to "0". Then, the procedure flows from step S202 via step S203 to step S207 in which a test is made to determine whether or not the condition of SP=1 is satisfied. Step S208 enters because of SP=0 (see step S203). In step S208, the current value of the air-pump inoperative time interval t2 is incremented by "1". In step S209, the time interval t2 is compared with the predetermined value β. Then the procedure returns from step S209 to step S207. The flow from step S207 via steps S208 and step S209 to step S207 is repeatedly executed and thus the time interval t2 gradually increases. Assuming that there is slight air leakage due to lowering of the gas-tightness of sealing members provided in the clearance (air-pressure supply passage) defined between the knuckle spindle 2 and the hub 3, there is a tendency that the air pressure in the chamber 4 becomes less than the predetermined pressure level and thus the pressure switch 152a becomes turned ON for a comparatively short period before the air-pump inoperative time interval t2 reaches the predetermined value β. In such a case, the procedure flows from step S207 to step S205 in which the air-leakage lamp 174 is switched ON by outputting the control signal LA (=1). On the other hand, in the case that there is not any air leakage, since the pressure switch 152a remains switched OFF and the ON/OFF signal SP is still held at "0", even when the time interval t2 has exceeded the predetermined value β, the procedure shifts to step S211 in which the controller outputs the control signal LA (=0) to the air-leakage lamp 174 to put out the latter. Thereafter, step S211 enters in which a test is made to determine whether the power-supply to the pump 152 has been stopped, i.e., the control signal P has been shifted to "0". When the power-supply to the pump ends, the sub-routine terminates. Conversely, in the case that the power-supply to the pump continues, the procedure returns from step S212 to step S201, so as to continue the detecting procedure for air-leakage.

As will be appreciated from the above, in the case of the operating state detecting system of free-wheel hub mechanism for a four-wheel-drive vehicle according to the invention, the driver can easily visually recognize the abnormally operating state of at least one of the free-wheel hub mechanisms on the basis of the fact that the HUB lamp 171 continues to flash. Furthermore, in the event that the driving torque is not delivered to the front-left and front-right wheels owing to abnormality in the free-wheel hub mechanism even when the four-wheel-drive mode is selected by the mode-select switch with respect to the transfer, with the 4WD lamp 173 flashing, the driver can easily visually recognize that the drive state of the vehicle is not actually sufficiently transferred to the four-wheel-drive state. The operating state detecting system of free-wheel hub mechanisms for a four-wheel-drive vehicle made in accordance with this invention only requires comparison of a predetermined threshold value A with respect to a deviation between a front-left axle driveshaft revolution-speed and a front-left wheel speed or comparison of the predetermined threshold value A with respect to a deviation between a front-right axle driveshaft revolution-speed and a front-right wheel speed in order to detect the operating state of the respective free-wheel hub mechanisms, whereas hitherto a plurality of limit switches and wiring for signal lines from the switches was necessary. Therefore, the system of the present invention can avoid the housing of the wheel hub from large-sizing and also prevent increased production costs. Moreover, in the embodiment previously described, the respective free-wheel hub mechanism is comprised of an air-pressure operated free-wheel hub mechanism. The controller can detect air-leakage in an air-pressure supply line of an air pump employed in the free-wheel hub mechanism in addition to detection of the operating state of the respective free-wheel hub mechanisms. The presence of air-leakage can be indicated in the form of an air-leakage lamp 174 switched ON. Therefore, the driver has only to cope with troubles such as jamming between the fixed gear 41 and the movable gear 42 or a faulty sliding mechanism for the movable gear 42 only in the event that the air-leakage lamp 174 is put out and the HUB lamp 171 is flashing. Also, it will be appreciated that the controller can be designed to easily detect a failure in a speed sensor (such as a wheel-speed sensor or a driveshaft revolution-speed sensor) itself by comparing a detected speed data output from a faulty speed sensor with a detected speed date output from the other speed sensor. For example, during usual straight-ahead driving, if the detected wheel-speed indicative signal value from a left wheel included in a first axle of front and rear axles is excessively different from that of a right wheel included in the first axle, the controller can determine that there is a failure in the wheel-speed sensor on the basis of comparison between the right and left wheel-speed indicative signal values. Thus, the system of the embodiment as explained never requires an additional trouble detecting device.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A system for detecting an operating state of an automobile free-wheel hub mechanism, which connects and disconnects an axle driveshaft to and from a wheel hub by engaging and disengaging a first member fixed onto the axle driveshaft for rotation with the axle driveshaft with and from a second member slidably disposed in the wheel hub and rotatable with the wheel hub, said system comprising:

first sensor means for detecting a revolution speed of a road wheel having said wheel hub to generate a wheel-speed indicative signal;

second sensor means for detecting a revolution speed of said axle driveshaft to generate a driveshaft revolution-speed indicative signal; and detection means for detecting presence of abnormality in said free-wheel hub mechanism on the basis of a deviation between a value of said wheel-speed indicative signal from said first sensor means and a value of said driveshaft revolution-speed indicative signal from said second sensor means.

2. In a free-wheel hub mechanism provided in each of auxiliary drive wheels of a four-wheel-drive vehicle equipped with a transfer, through which a two-wheel-drive mode and a four-wheel-drive mode are switchable, for connecting and disconnecting an axle driveshaft of each of said auxiliary drive wheels to and from a wheel hub connectable to said axle driveshaft when switching from one of said two-wheel-drive mode and said four-wheel-drive mode to another, a system for detecting an operating state of the vehicle free-wheel hub mechanism, comprising:

first sensor means for detecting a revolution speed of each of said auxiliary drive wheels to generate a wheel-speed indicative signal;

second sensor means for detecting a revolution speed of said axle driveshaft to generate a driveshaft revolution-speed indicative signal; and detection means for detecting presence of abnormality in said free-wheel hub mechanism on the basis of a deviation between a value of said wheel-speed indicative signal from said first sensor means and a value of said driveshaft revolution-speed indicative signal from said second sensor means, wherein said detection means determines presence of abnormality in said free-wheel hub mechanism when a drive mode of the four-wheel-drive vehicle is shifted to said two-wheel-drive mode via said transfer and at least one of a first deviation between a value of said wheel-speed indicative signal from said first sensor means attached to a first drive wheel of said auxiliary drive wheels and a value of said driveshaft revolution-speed indicative signal from said second sensor means attached to a driveshaft associated with said first drive wheel and a second deviation between a value of said wheel-speed indicative signal from said first sensor means attached to a second drive wheel of said auxiliary drive wheels and a value of said driveshaft revolution-speed indicative signal from said second sensor means attached to a driveshaft associated with said second drive wheel is less than or equal to a predetermined threshold value.

3. In a free-wheel hub mechanism provided in each of auxiliary drive wheels of a four-wheel-drive vehicle equipped with a transfer through which a two-wheel-drive mode and a four-wheel-drive mode are switchable, for connecting and disconnecting an axle driveshaft of each of said auxiliary drive wheels to and from a wheel hub connectable to said axle driveshaft when switching from one of said two-wheel-drive mode and said four-wheel-drive mode to another, a system for detecting an operating state of the automobile free-wheel hub mechanism, comprising:

first sensor means for detecting a revolution speed of each of said auxiliary drive wheels to generate a wheel-speed indicative signal;

second sensor means for detecting a revolution speed of said axle driveshaft to generate a driveshaft revolution-speed indicative signal; and detection means for detecting presence of abnormality in said free-wheel hub mechanism on the basis of a deviation between a value of said wheel-speed indicative signal from said first sensor means and a value of said driveshaft revolution-speed indicative signal from said second sensor means, wherein said detection means determines presence of abnormality in said free-wheel hub mechanism when a drive mode of the four-wheel-drive vehicle is shifted to said four-wheel-drive mode via said transfer and at least one of a first deviation between a value of said wheel-speed indicative signal from said first sensor means attached to a first drive wheel of said auxiliary drive wheels and a value of said driveshaft revolution-speed indicative signal from said second sensor means attached to a driveshaft associated with said first drive wheel and a second deviation between a value of said wheel-speed indicative signal from said first sensor means attached to a second drive wheel of said auxiliary drive wheels and a value of said driveshaft revolution-speed indicative signal from said second sensor means attached to a driveshaft associated with said second drive wheel is greater than a predetermined threshold value.

4. A system for detecting an operating state of a free-wheel hub mechanism for a four-wheel-drive vehicle, which mechanism connects and disconnects an axle driveshaft to and from a wheel hub by engaging and disengaging a fixed gear firmly connected onto the axle driveshaft for rotation with the axle driveshaft with and from a movable gear slidably splined to an inner periphery of the wheel hub and rotatable with the wheel hub, said system comprising:

first sensor means for detecting a revolution speed of a first wheel of auxiliary drive wheels each having said wheel hub and a revolution speed of a second wheel of said auxiliary drive wheels to generate first and second wheel-speed indicative signals;

second sensor means for detecting a revolution speed of the axle driveshaft associated with said first wheel and a revolution speed of the axle driveshaft associated with said second wheel to generate first and second driveshaft revolution-speed indicative signals; and detection means for detecting an operating state of said free-wheel hub mechanism depending on a first deviation between a value of said first wheel-speed indicative signal and a value of said first driveshaft revolution-speed indicative signal and a second deviation between a value of said second wheel-speed indicative signal and a value of said second driveshaft revolution-speed indicative signal, so that said detecting means determines presence of abnormality in at least one of said free-wheel hub mechanisms when a drive mode of said four-wheel-drive vehicle is shifted to said two-wheel-drive mode via said transfer and at least one of said first deviation and said second deviation is less than or equal to a first predetermined threshold value and when the drive mode is shifted to said four-wheel-drive mode via said transfer and at least one of said first and second deviations is greater than said first predetermined threshold value.

5. A system as set forth in claim 4, which further comprises third sensor means for detecting a revolution speed of a first propeller shaft connected to said auxiliary drive wheels and a revolution speed of a second propeller shaft connected to main drive wheels to generate first and second propeller-shaft revolution-speed indicative signals and means for inhibiting said movable gear being engaged with and disengaged from said fixed gear in each of said free-wheel hub mechanisms in case that a third deviation between a value of said first propeller-shaft revolution-speed indicative signal and a value of said second propeller-shaft revolution-speed indicative signal is greater than a second predetermined threshold value when the drive mode is shifted from one of said two-wheel-drive mode and said four-wheel-drive mode to another.

6. A system for detecting an operating state of an air-pressure operated free-wheel hub mechanism for a four-wheel-drive vehicle, which mechanism connects and disconnects an axle driveshaft to and from a wheel hub by engaging and disengaging, via air pressure, a fixed gear firmly connected onto the axle driveshaft for rotation with the axle driveshaft with and from a movable gear slidably splined to an inner periphery of the wheel hub and rotatable with the wheel hub and biased to a spring-loaded position, said air pressure being generated by an air pump and supplied to a pressure chamber facing said movable gear for sliding said movable gear against a spring load, said system comprising:

a pressure switch responsive to a pressure level of a discharge pressure of air discharged from said air pump so that said pressure switch is switched ON when said discharge pressure is less than a predetermined pressure level and switched OFF when said discharge pressure is greater than or equal to said predetermined pressure level, said pressure switch generating a signal representative of switched-ON and switched-OFF states of said pressure switch;

first sensor means for detecting a revolution speed of a first wheel of auxiliary drive wheels each having said wheel hub and a revolution speed of a second wheel of said auxiliary drive wheels to generate first and second wheel-speed indicative signals;

second sensor means for detecting a revolution speed of the axle driveshaft associated with said first wheel and a revolution speed of the axle driveshaft associated with said second wheel to generate first and second driveshaft revolution-speed indicative signals;

first detection means for detecting an operating state of said free-wheel hub mechanism depending on a first deviation between a value of said first wheel-speed indicative signal and a value of said first driveshaft revolution-speed indicative signal and a second deviation between a value of said second wheel-speed indicative signal and a value of said second driveshaft revolution-speed indicative signal, so that said first detecting means determines presence of abnormality in at least one of said free-wheel hub mechanisms when a drive mode of said four-wheel-drive vehicle is shifted to said two-wheel-drive mode via said transfer and at least one of said first deviation and said second deviation is less than or equal to a first predetermined threshold value and when the drive mode is shifted to said four-wheel-drive mode via said transfer and at least one of said first and second deviations is greater than said first predetermined threshold value; and second detection means for monitoring a first time interval ranging from a first leading edge of said signal from said pressure switch to a first trailing edge of said signal, which first trailing edge follows said first leading edge, and a second time interval ranging from said first trailing edge of said signal to a second leading edge of said signal, which second leading edge follows said first trailing edge, said second detection means determining excessive air-leakage when said pressure switch remains switched ON after said first time interval reaches a first predetermined value, and said second detection means determining slight air-leakage when said pressure switch is shifted from said switched-OFF state to said switched-ON state before said second time interval reaches a second predetermined value.

7. A system as set forth in claim 6, which further comprises third sensor means for detecting a revolution speed of a first propeller shaft connected to said auxiliary drive wheels and a revolution speed of a second propeller shaft connected to main drive wheels to generate first and second propeller-shaft revolution-speed indicative signals and means for inhibiting said movable gear being engaged with and disengaged from said fixed gear in each of said free-wheel hub mechanisms in case that a third deviation between a value of said first propeller-shaft revolution-speed indicative signal and a value of said second propeller-shaft revolution-speed indicative signal is greater than a second predetermined threshold value when the drive mode is shifted from one of said two-wheel-drive mode and said four-wheel-drive mode to another.

* * * * *